3,200,930
ARTICLE FEEDING APPARATUS
William R. Blackwood, Topsfield, Mass., assignor to Consolidated Cigar Corporation, New York, N.Y., a corporation of Delaware
Filed Jan. 3, 1964, Ser. No. 335,515
16 Claims. (Cl. 198—24)

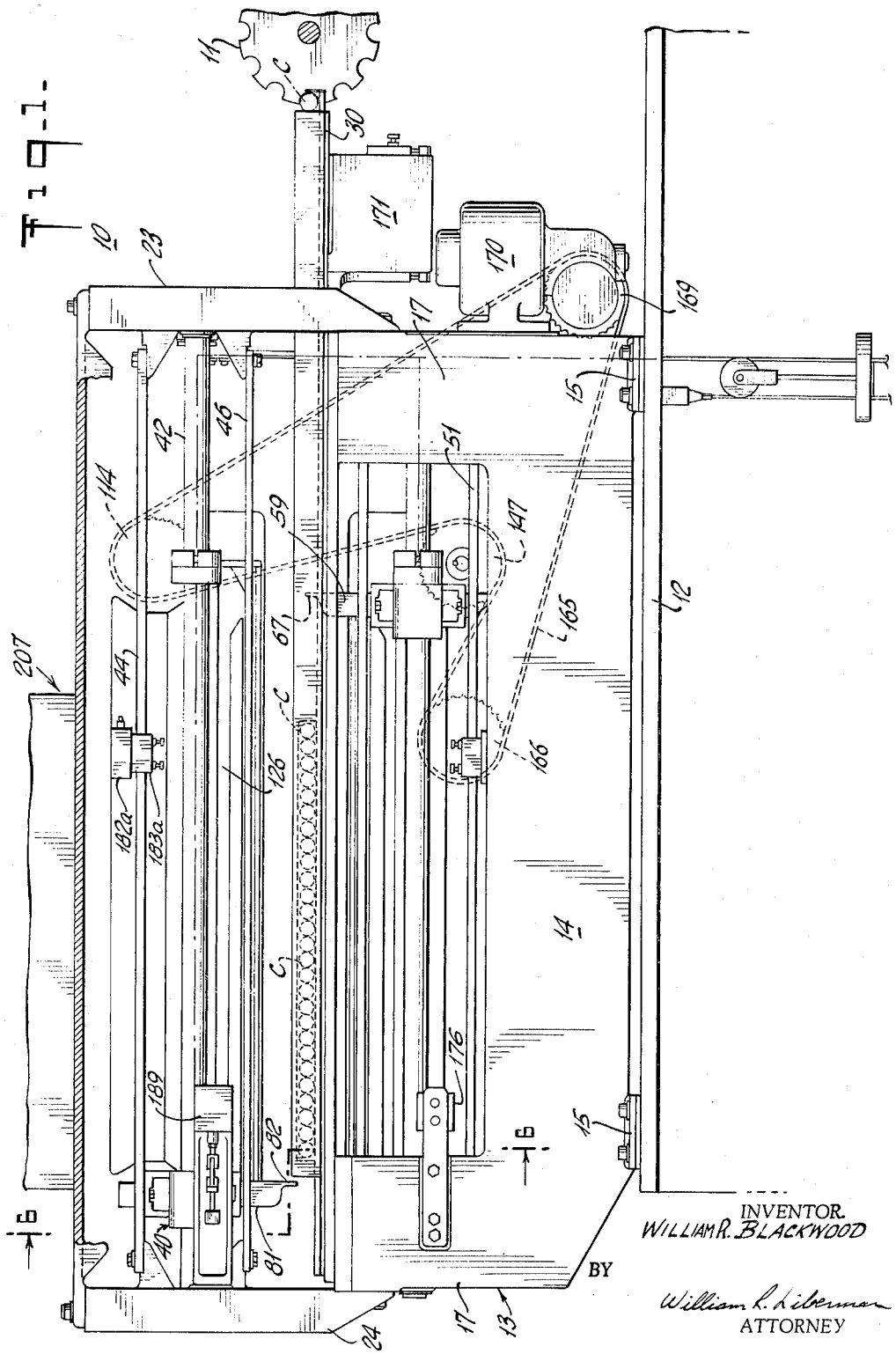

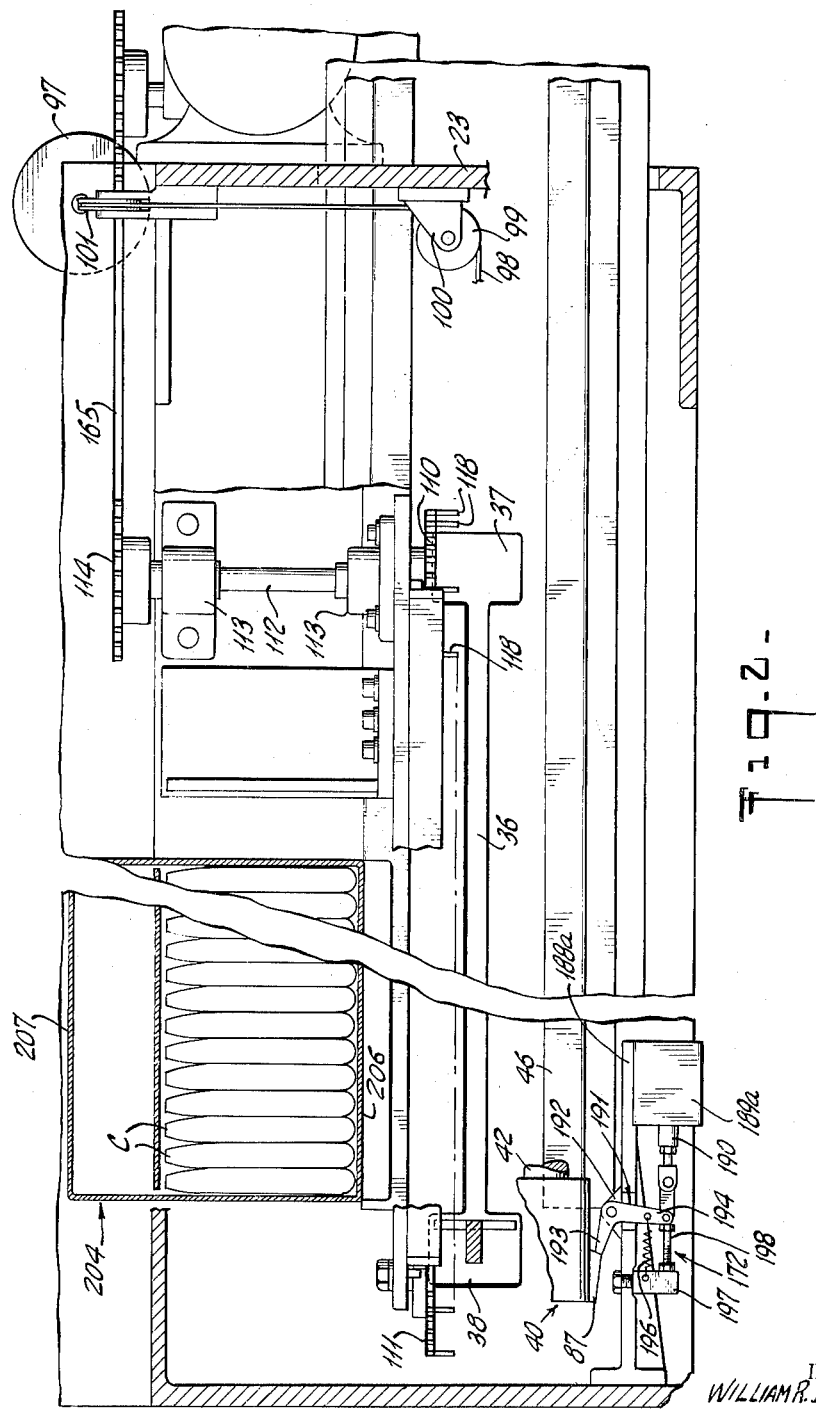

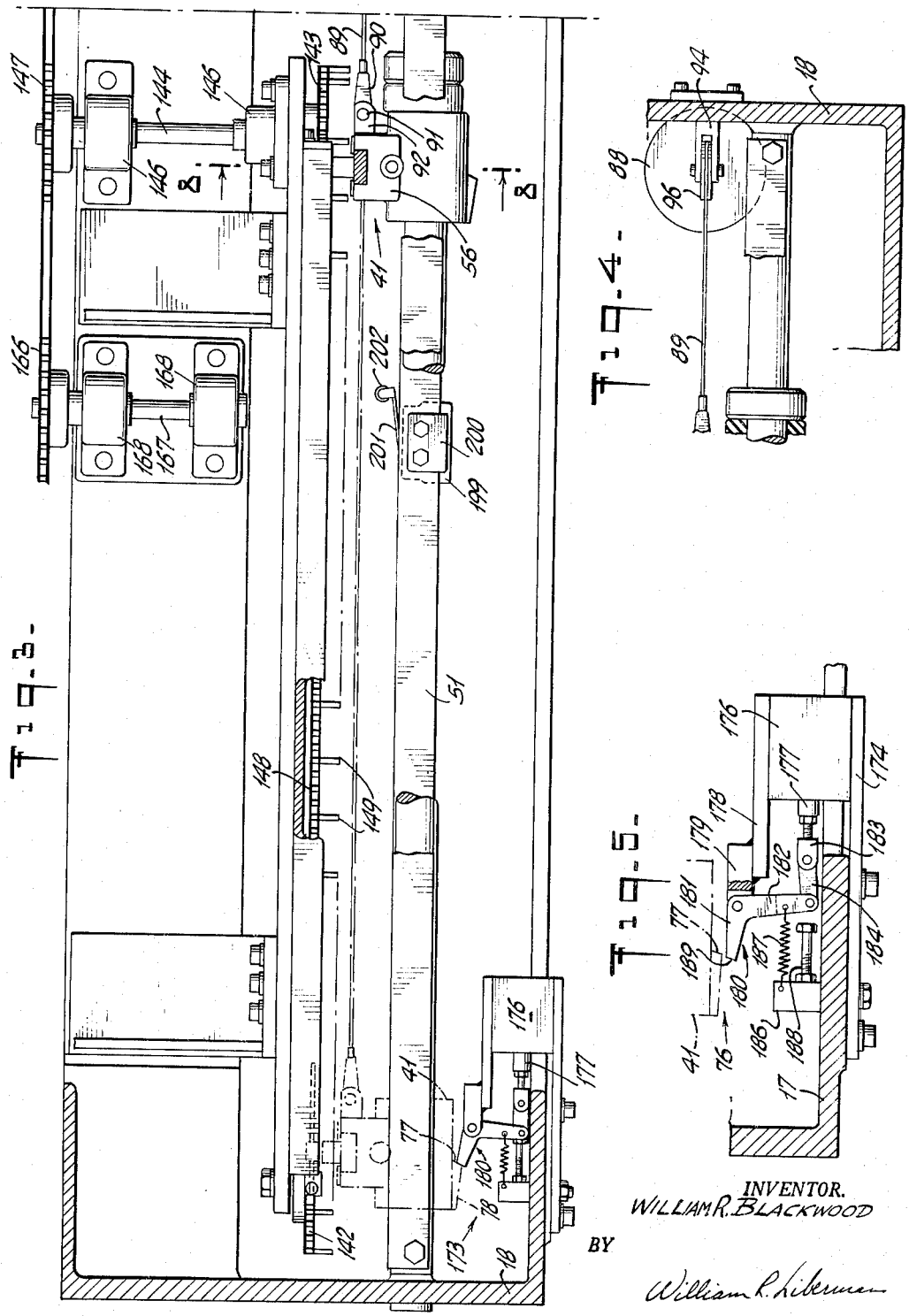

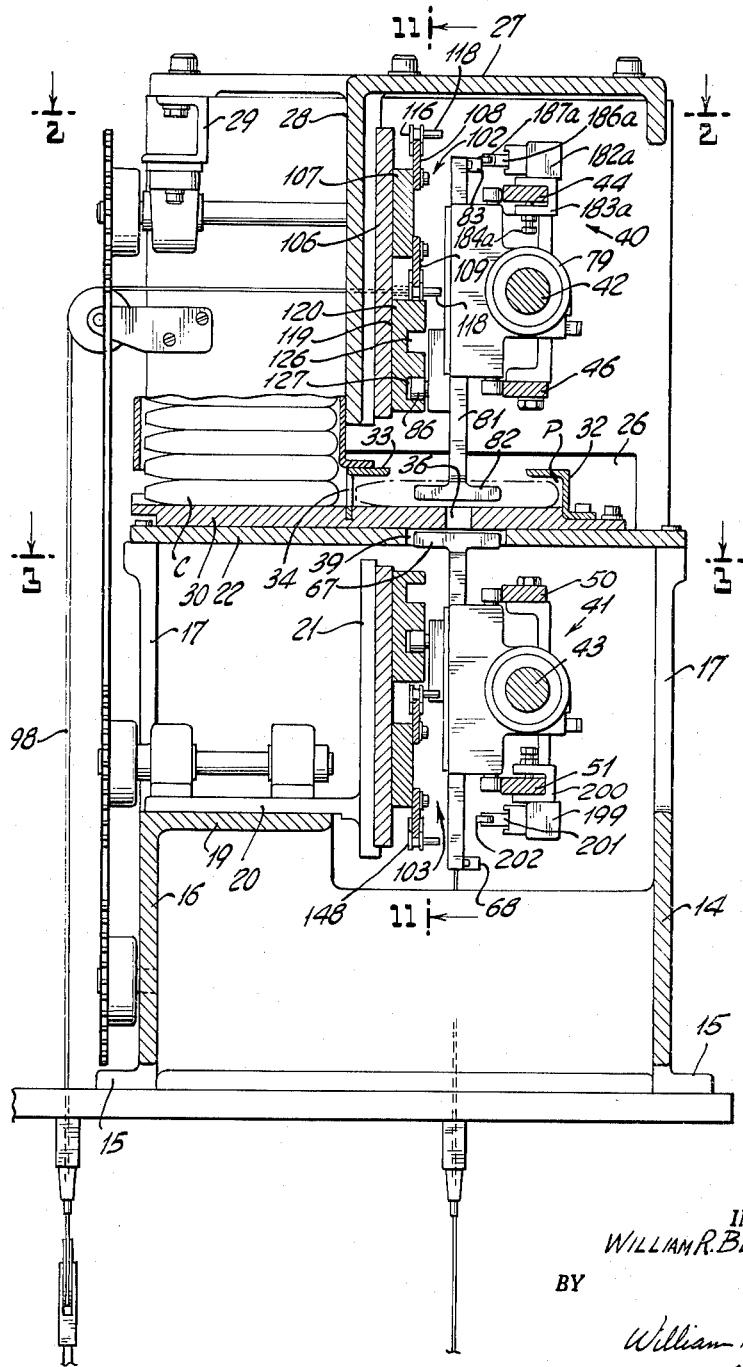

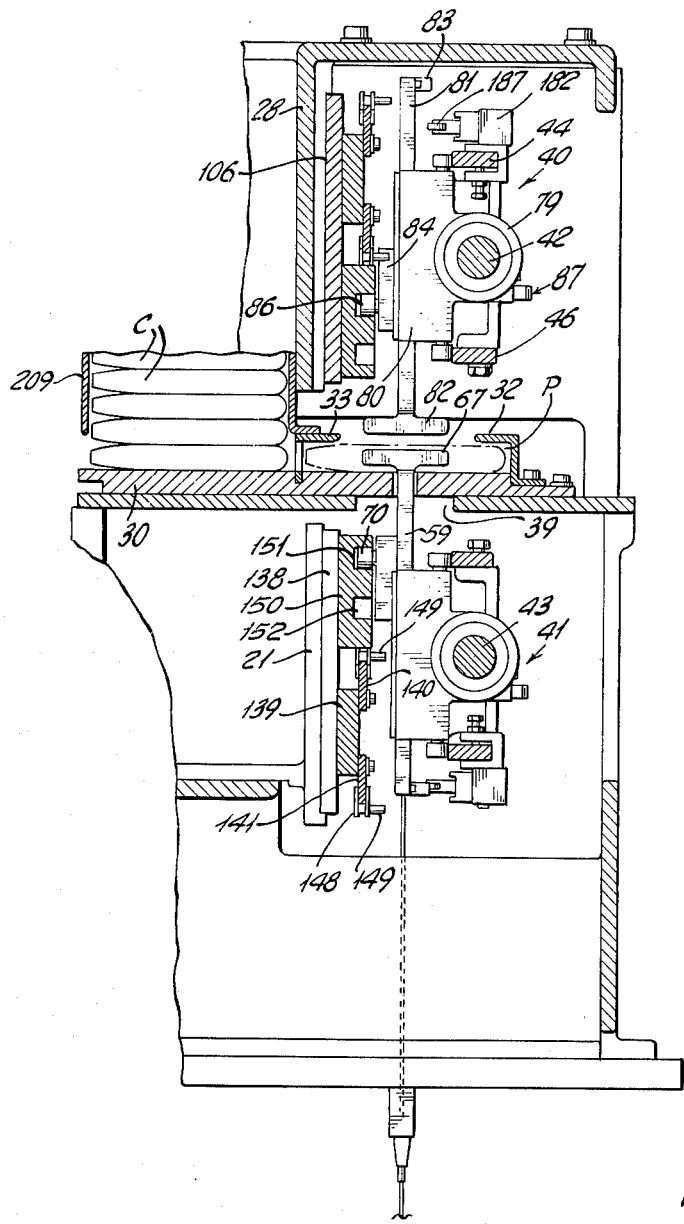

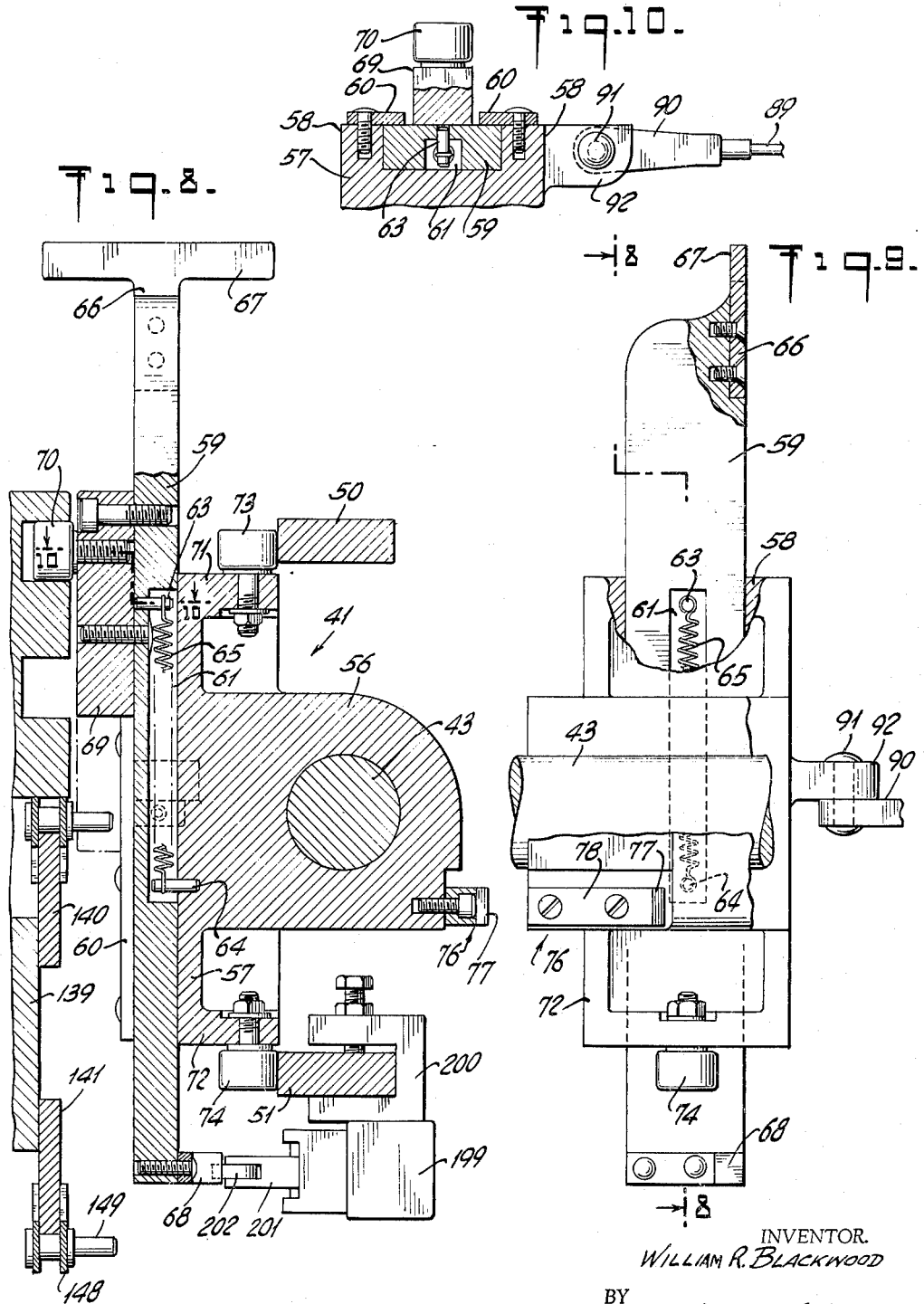

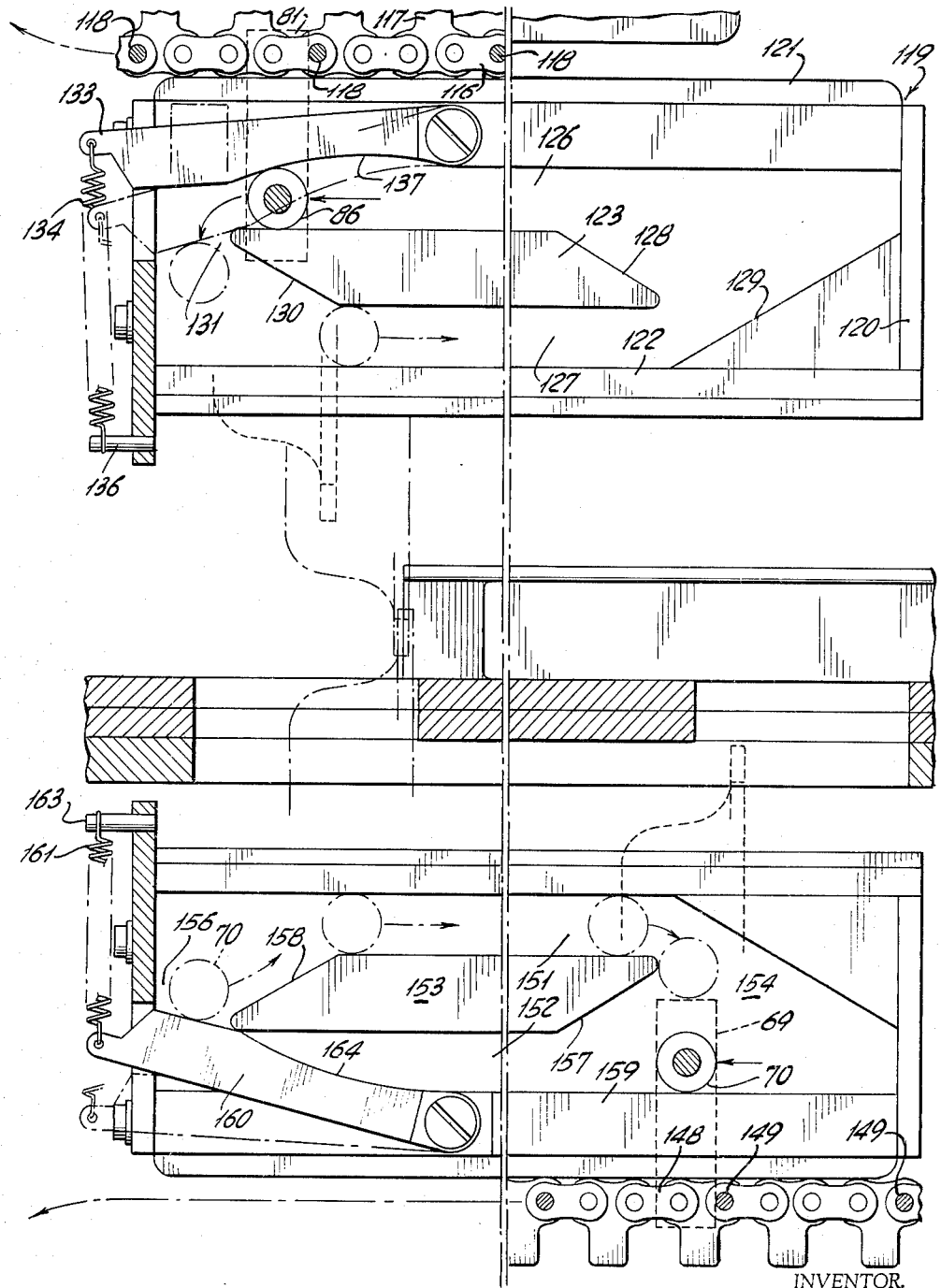

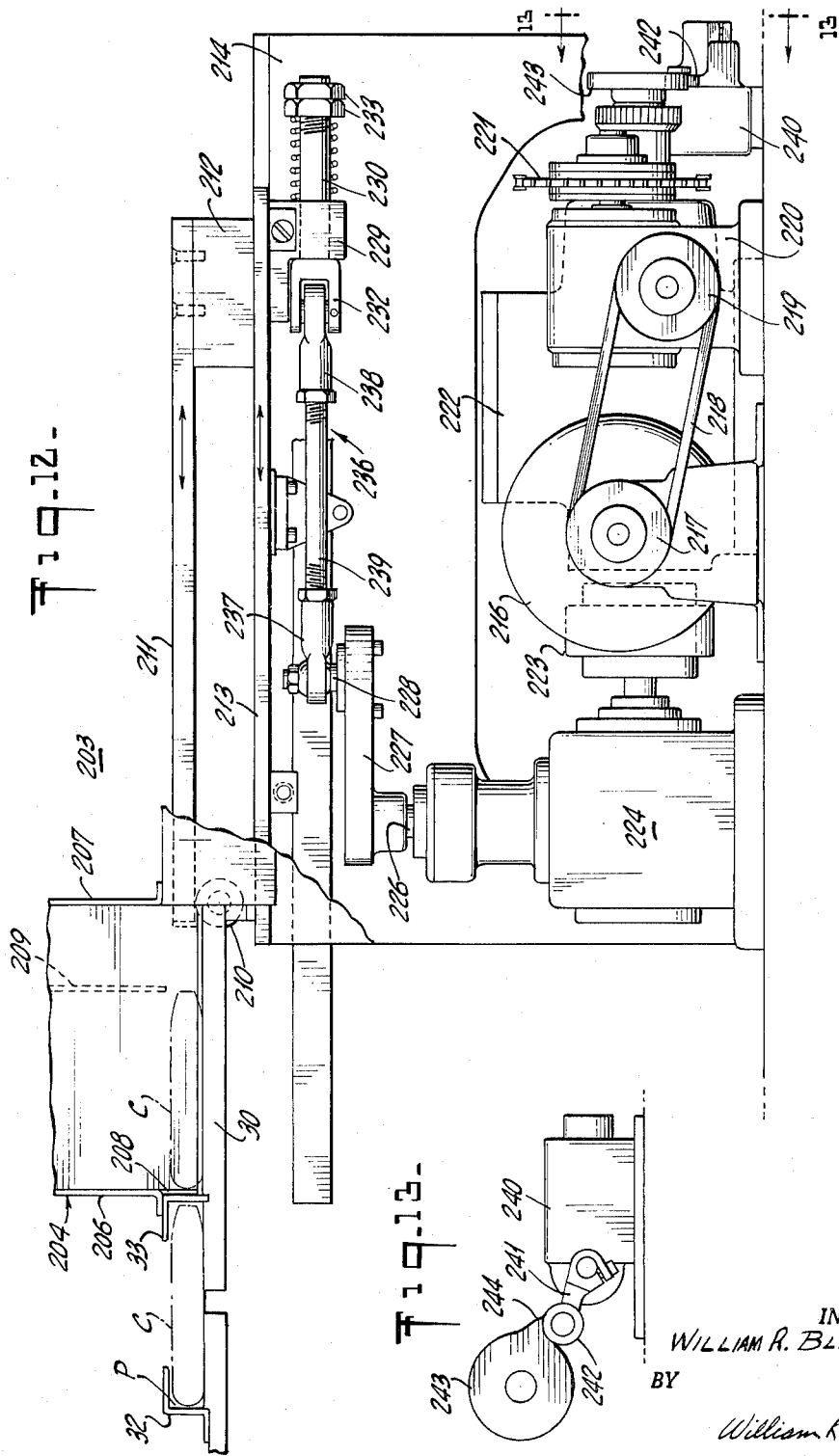

The present invention relates generally to improvements in article handling apparatus, and it relates in particular to an improved apparatus for delivering and feeding articles to a metering or indexing device.

Many procedures require the separation of successive individual articles from a group thereof attendant the subsequent individual handling of these articles. The proper feeding of the articles to the separating mechanism is very difficult particularly where high speeds are desired and the articles are of a fragile or delicate nature and thus require very careful handling. Many forms of apparatus have been employed and proposed for delivering articles to indexing and metering devices, but these have possessed many drawbacks and disadvantages which render them unsatisfactory for many uses. These earlier devices are relatively slow and hence frequently are the limiting factor in the capacity of the associated equipment. In addition, their operation is usually not of a uniform nature and a relatively rough handling of the conveyed articles is experienced so that its use is unsuitable with articles which require careful handling. Typical of such articles are cigars which are relatively fragile and handled in large quantities attendant the inspection, treatment and packaging thereof. Thus, the conventional equipment for delivering cigars to high speed metering and indexing devices leaves much to be desired.

It is, therefore, a principal object of the present invention to provide an improved apparatus for handling and transporting a plurality of articles.

Another object of the present invention is to provide an improved apparatus for delivering successive articles from a group thereof to a metering or indexing device.

Still another object of the present invention is to provide an improved apparatus for rapidly dispensing successive articles from a group thereof at a delivery station under continuously uniform conditions.

A further object of the present invention is to provide an improved apparatus for delivering cigars in side by side relationship to a rapidly operating withdrawal device under a continuously uniform pressure.

Still a further object of the present invention is to provide an apparatus of the above nature characterized by its ruggedness, versatility and reliability.

The above and other objects of the present invention will become apparent from a reading of the following description, taken in conjunction with the accompanying drawings, wherein FIGURE 1 is a front elevational, partially fragmentary view of an apparatus embodying the present invention;

FIGURE 2 is a sectional view taken along line 2—2 in FIGURE 6;

FIGURE 3 is a fragmentary sectional view taken along line 3—3 in FIGURE 6, the lower pusher being illustrated by broken line in a retracted position;

FIGURE 4 is a fragmentary top plan view showing a pusher advancing weight;

FIGURE 5 is a fragmentary enlarged top plan view showing a truck latching member in a truck release position;

FIGURE 6 is a sectional view taken along line 6—6 in FIGURE 1, the upper pusher member being shown in advancing position and the lower pusher member in a retracted position;

FIGURE 7 is a view similar to FIGURE 6, the lower pusher member being shown in an advancing position, and the upper pusher member in a retracted position;

FIGURE 8 is an enlarged sectional view taken along line 8—8 in FIGURES 3 and 9;

FIGURE 9 is a front view of the pusher section of the apparatus illustrated in FIGURE 8;

FIGURE 10 is a sectional view taken along line 10—10 in FIGURE 8;

FIGURE 11 is an enlarged sectional view taken along line 11—11 in FIGURE 6;

FIGURE 12 is a fragmentary end view of the side row feeding mechanism of the present apparatus; and FIGURE 13 is a rear view of the side row feeding mechanism index cam and switch.

In a sense, the present invention contemplates the provision of an article feeding apparatus comprising a pair of pusher members movable along predetermined paths between advanced and retracted positions, means for releasably locking said pusher members in said retracted positions, means for returning said pusher members to said retracted positions, means for urging said pusher members toward said advanced positions, and means responsive to a predetermined position of each of said pusher members forward of said retracted position for actuating an opposite of said locking means to release the other of said pusher members.

According to a preferred form of the present apparatus as applied to the feeding of cigars, there is provided a longitudinally extending, horizontal, cigar guide track and the pusher members are disposed above and below the track respectively and each includes a carrier member slidably mounted on a corresponding longitudinal rail and a pusher element supported by the carrier and vertically movable to an advanced or active position in registry with the track and to a retracted or inactive position out of registry therewith. A longitudinal pusher control cam track is associated with each of the pusher members and is engaged by a follower carried by each of the pusher elements to maintain the pusher element in its active position with the advance movement of the carrier and in an inactive position with the return movement of the carrier, the pusher element being switched between its active and inactive positions at the respective ends of longitudinal path. Each of the carriers is urged to advance by a descending weight connected thereto by a flexible cable passing over guide pulleys and is returned to its retracted position by a continuously driven longitudinally extending chain, the return path of which is engaged by the pusher element when it is in its vertically retracted or inactive position. The locking means includes a latch member which is moved to a release position by a solenoid connected through a normally open switch to a current source, the switch actuating arm being disposed in the path of an opposite carrier adjacent the leading section imposed rows of cigars is disposed adjacent the trailing imposed rows of cigars is disposed adjacent th trailing side of the cigar track and is provided with a transverse pusher member which is periodically actuated with the passage of a longitudinal pusher member to advance a row of cigars transversely from the hopper onto the cigar track and into a position forward of the retracted longitudinal pusher member.

Referring now to the drawings which illustrate a preferred embodiment of the present invention, reference numeral 10 generally designates the improved apparatus which is employed for feeding the cigars C to a rapidly rotating indexing wheel 11 which meters the cigars C to an inspection apparatus or other desired cigar handling equipment which is not shown and does not form part of the present invention. Apparatus 10 includes a suitably mounted elevated base plate 12 upon which a support framework 13 is located. Framework 13 comprises front and rear longitudinally extending vertical panels 14 and 16 respectively, each of the panels terminating at opposite ends in upwardly directed correspondingly coplanar panels 17. Panels 14 are provided along their bottom edges with spaced foot pieces 15 which are bolted to base plate 12. The outer side edges of end panels 17 are joined by opposite vertical end walls 18.

Projecting forwardly from the upper edge of rear panel 16 is a wide horizontal flange 19 upon which is superimposed and affixed a base plate 20 supporting along its forward edge a longitudinally extending vertical mounting plate 20. A horizontally extending plate 22 is supported upon and between the vertical end panels 17. A pair of leading and trailing upper end walls 23 and 24 project above the corresponding end walls 18, the front wall 23 being provided along its base with a transverse opening 26. Supported by and extending between the forward top edges of walls 23 and 24 is a horizontal plate 27 provided along its front edge with a depending flange and along its rear edge with a depending medially located longitudinally extending vertical panel 28. Supported by and between the rear upper corners of the walls 23 and 24 is a longitudinally extending channel member 29 having a horizontal bottom leg.

Superimposed on base plate 22 and extending for the full length thereof and through the opening 26 beyond the front wall 23 is an article support plate 30 of slightly less width than the underlying plate 22. A pair of transversely-spaced longitudinally extending front and rear angle members 32 and 33 respectively delineate an article track or passageway P and include parallel vertical webs suitably affixed to the plate 30 and upper coplanar legs directed toward each other; see FIGURE 6. The vertical web of rear angle member 33 is medially located along plate 30 and has a longitudinal trailing slot 34 formed therein to permit the periodic insertion therethrough of rows of cigars C as will be hereinafter set forth. A longitudinally extending slot 36 is formed in plate 30 intermediate angle members 32, 33 and terminates at its opposite ends in leading and trailing enlarged rectangular openings 37 and 38 respectively. A longitudinally extending slot 39 is formed in underlying plate 22 and is of the width of openings 37 and 38, and extends between the outer opposite edges thereof.

Upper and lower pusher members 40 and 41 respectively, of similar construction, are slidably supported above and below guide plate 30 by upper and lower longitudinally extending horizontal rails 42 and 43 respectively, which are in the form of cylindrical bars. Rails 42 and 43 lie in a common vertical plane which is forward of cigar passageway P and are suitably supported by end walls 23 and 24 and end walls 18. Associated with the upper rail 42 is a pair of longitudinally extending horizontal upper and lower tracks 44 and 46 disposed above and below rail 42 and parallel thereto. Lower track 46 is defined by a rectangular bar which extends between end walls 23 and 24 and is supported by suitably mounted brackets.

The upper track 44 is likewise defined by a rectangular bar which extends between end walls 23 and 24 and is supported thereby by suitably mounted end brackets. Similarly associated with bottom rail 43 are upper and lower parallel tracks 50 and 51 respectively which extend longitudinally between the end walls 18 and are supported at their end by suitably mounted end brackets.

As best seen in FIGURES 8 to 10 of the drawings, lower pusher member 41 includes a truck body member 56 having a longitudinal bore formed therein which mates and slidably engages lower rail 43. A vertical wall 57 is integrally formed with and is disposed at the rear of body member 56. Wall 57 extends above and below body member 56 and has formed in its rearwardly directed face a vertical rectangular groove delineated by side walls 58.

A pusher element defining slide bar 59 engages the groove in wall 57 and has a rear face coplanar with the rear face of wall 57, slide bar 59 projecting above and below the ends of wall 57. Retaining bar 59 in sliding engagement with the wall slot is a pair of vertical opposite lock plates 60 which are secured to the rear faces of the walls 58 and overlie the side rear borders of slide bar 59. Formed in the inner face of slide bar 59 is a vertically extending recess 61 and a pin 63 supported by bar 59 is disposed in the upper part of the recess 61. A second pin 64 is mounted on wall 57 and projects into the lower part of recess 61. Housed in recess 61 and having its opposite ends connected to the pins 63 and 64 is a helical tension spring 65 which normally urges slide bar 59 to a depressed or retracted inactive position.

Mounted at the upper end of slide bar 59 is a T-shaped member including a vertical leg 66 affixed to the leading face of the bar 59 and an upper transversely extending pusher arm 67. The lower end of slide bar 59 carries a forwardly directed tripper arm 68. Affixed to the rear face of slide bar 59, between the top and bottom thereof and between the lock plates 60, is a rearwardly directed vertical block 69. A rearwardly projecting follower-defining roller 70 is mounted on the upper rear face of block 69 and is rotatable about a transverse axis, block 69 extending below roller 70.

Projecting forwardly from the top and bottom of rear wall 57 are upper and lower lugs 71 and 72 respectively. A guide roller 73 rotatable about a vertical axle is mounted atop lug 71 and engages the rear face of track 50, and a guide roller 74 likewise rotatable about a vertical axle is mounted to the underface of the lug 72 and engages the rear face of track 51 to assure a smooth linear easy longitudinal movement of pusher member 41. A prismatic latch block 76 is mounted on the bottom front face of carrier body member 56 by means of screws registering with wells in block 76 and includes a leading latching face 77 and trailing inclined cam face 78.

The upper pusher member 40, as seen in FIGURE 7, is similar in construction but inverted relative to the lower pusher member 41, and includes a body member 79 having a longitudinal bore engaging upper rail 42, and provided at its top and bottom with rollers which engage the rear faces of tracks 44 and 46. A vertically slotted rear wall 80 is formed on body member 79 and supports a vertical slide bar 81 carrying a transverse pusher arm 82 at its lower end and a forwardly directed tripping arm 83 at its upper end. Slide bar 81 is spring urged to a retracted inactive or raised position and supports a rearwardly directed block 84 on the bottom rear face of which is mounted a rearwardly directed follower-defining roller 85. A latch block 87 is mounted on the lower rear face of the truck body member 79. It is to be noted that when slide bar 81 is in its retracted position, pusher arm 82 is just above the level of guide members 32 and 33, and when slide bar 59 is in its retracted inactive position pusher arm 67 is just below the level of the underface of plate 30 in registry with slot 39 in plate 22.

As best seen in FIGURES 3, 4 and 10 of the drawings, lower pusher member 41 is urged toward its advanced position by a suspended weight member 88. Weight member 88 is connected to one end of a flexible cable 89, the opposite end of which is affixed to an eye coupling member 90. Coupling member 90 is pivotally connected by means of a pin 91 to a lug 92 projecting from the leading face of truck body member 56. Mounted on the leading end wall 18 by means of a bracket 94 is a rotatable pulley 96, the upper periphery of which is at about the level of lug 92, cable 89 extending from the pusher member 41 about the upper periphery of the pulley 96 to the suspended weight 88.

In a like manner, as seen in FIGURES 2 and 6 of the drawings, upper pusher member 40 is urged to advance by a weight member 97 by way of a flexible cable 98. Cable 98 has a downward force applied to one end thereof by the suspended weight member 97 and has its other end connected to pusher body member 79 in the manner described above. The cable extends from pusher member 40 about a first pulley 99 mounted on the leading end wall 23 for rotation about a vertical axis by a bracket 100 and thence about the upper periphery of a pulley 101 mounted rearwardly of pulley 100 and rotatable about a longitudinal axis. Thus, both the upper and lower pusher members 40 and 41 are urged to advance with an adjustable uniform force along the full lengths of their paths.

In order to return upper and lower pusher members 40 and 41 as well as the weight members 88 and 97 to their respective retracted positions, upper and lower return assemblies 102 and 103 are associated with the upper and lower pusher members 40 and 41 respectively. Upper return assembly 102 includes a longitudinal vertical mounting panel 106 affixed to the front face of wall 23, and having mounted in its front face a longitudinally extending horizontal block 107. Upper and lower parallel tracks 108 and 109 extend along and are secured to the front face of block 107 and project above and below the top and bottom edges thereof. A leading sprocket wheel 110 is disposed ahead of and coplanar with tracks 108 and 109 and a trailing sprocket wheel 111 is disposed behind and is coplanar with the tracks 108 and 109. The upper and lower peripheries of the sprocket wheels 110 and 111 are at the levels of the upper and lower edges of the tracks 108 and 109 respectively and the trailing sprocket wheel 111 is freely rotatable and suitably journalled to plate 28.

Leading sprocket wheel 110 is affixed to the forward end of a shaft 112 which is journalled between and extends beyond a pair of transversely spaced suitably mounted bearing blocks 113. A sprocket wheel 114 is affixed to the rear end of the shaft 112. A sprocket chain 116 is engaged by and extends between the sprocket wheels 110 and 111 and travels in its longitudinal paths along the tracks 108 and 109, being restricted thereto by the legs 117 carried by the chain links and engaging the faces of the tracks. Projecting forwardly from alternate of the sprocket chain links are detent-defining pin elements 118, the distance between successive elements 118 being greater than that of block 84.

A longitudinally extending cam track 119 is mounted on panel 106 below track 109 and includes an elongated block 120 having a top face engaging the underface of and restricting the sprocket chain 116 along its return run to bottom track 109. Delineated in the front face of block 120 by top, bottom and intermediate walls 121, 122 and 123 respectively are upper and lower longitudinal passageways or grooves 126 and 127 (FIG. 11). The leading end of intermediate wall 123 is inclined downwardly toward its leading end, as at 128, and is directed toward a forwardly upwardly inclined surface 129 extending from wall 122 and defines therewith an end passageway leading from the bottom passageway 127 to top passageway 126.

The trailing end 130 of intermediate wall 123 is downwardly forwardly inclined and a trailing end passageway 131 is provided between the upper passageway 126 and lower passageway 127. Upper wall 121 terminates at its trailing end at a point forward of the trailing end of intermediate wall 123, and has hinged thereto by means of a suitable pivot screw a rearwardly extending check lever 133. Check lever 133 projects beyond the trailing end of block 120 and is resiliently urged to a depressed position in engagement with the top face of intermediate wall 123 by a helical tension spring 134 connecting the free end of the lever 133 to a fixed pin 136 mounted on the block 120. It is to be noted that spring 134 is heavier and stronger than the corresponding slide bar spring 65 (FIG. 8). The trailing underface of the lever 133 defines a cam surface 137.

The upper pusher element follower 86 engages cam track 119 and is guided thereby. When follower 86 registers with lower track 127, slide bar 81 is depressed to bring pusher arm 82 in registry with the cigar longitudinal passageway P, and block 84 out of the path of sprocket chain pins 118. On the other hand, when follower 86 registers with upper passageway 126, slide bar 81 is raised to its retracted inactive position to elevate the pusher arm above cigar path P and bring block 84 into registry with the path of return travelling sprocket chain detent pins 118.

The lower return assembly 103 is of similar construction but inverted relative to the upper return assembly 102 and is mounted on a panel 138 affixed to the plate 21. It includes a lower longitudinal block 139 supporting upper and lower tracks 140 and 141 respectively, adjacent the ends of which are located a trailing idler sprocket wheel 142 and a leading sprocket wheel 143. Leading sprocket wheel 143 is mounted on the forward end of a shaft 144 journalled in a pair of spaced bearing blocks 146 and having a sprocket wheel 147 affixed to its rear end. A sprocket chain 148 extends along tracks 140 and 141 and around and in engagement with the sprocket wheels 142 and 143, and alternate links of the sprocket chain 148 carry forwardly directed pin elements 149.

A longitudinal cam track 150 is mounted on the front face of panel 138 directly above track 140 and is provided in its front face with upper and lower longitudinal grooves or passageways 151 and 152 respectively, separated by an intermediate wall 153 and provided at its leading and trailing ends with connecting passageways 154 and 156. The leading end face 157 of intermediate wall 153 is rearwardly downwardly inclined and the trailing end face 158 thereof is likewise downwardly rearwardly inclined.

The bottom wall 159 of lower passageway 152 terminates at a point short of the trailing end of the passageway, and has hinged thereto a check lever 160, the free end of which extends beyond the passageway 156 and is connected by a heavy helical tension spring 161 to an upper fixed pin 163 to swing lever 160 upwardly to wall 153 with a greater force than that exerted by slide bar spring 65; FIG. 8. The trailing upper face 164 of lever 160 defines a cam surface. Just as with upper return assembly 102, the lower pusher member follower 70 is engaged by cam track 150. However, when follower 70 engages top passageway 151, the pusher arm is in registry with the cigar passageway P and block 69 is out of the path of the sprocket chain pins elements 149, and when the follower 70 engages the bottom passageway 152 the pusher arm is out of the cigar path P and block 69 is in the path of the sprocket chain pin elements 149.

The leading sprocket wheels 110 and 143 are rotated in opposite directions by the respective shafts 112 and 144 thereby to convey upper sprocket chain 116 rearwardly along its bottom run and lower sprocket chain 148 rearwardly along its top run. The aforesaid drive is effected by a sprocket chain 165 which engages the top periphery of sprocket wheel 114 and the bottom periphery of sprocket wheel 147, extending between the front edge of sprocket wheel 147 and the rear edge of sprocket wheel 114; see FIG. 1. Sprocket chain 165 travels about a trailing idler sprocket wheel 166 affixed to a shaft 167 journalled in suitably supported bearing blocks 168 and about a sprocket wheel 169 affixed to the drive shaft of a continuously running gear reduction motor 170. Motor 170 is connected through a suitable switch to a source of current and is mounted on the leading end wall 18. An electrically energized vibrator 171 is affixed to the underface of the leading end of guide plate 30, to vibrate the plate 30 and minimize the frictional resistance thereof to the movement of cigars C.

The upper and lower pusher members 40 and 41, as best seen in FIGURES 2, 3 and 5 of the drawings, are releasably locked in their retracted positions by upper and lower similarly constructed latch assemblies 172 and 173 respectively. The lower latch assembly 173 comprises a support plate 174 affixed to and projecting forwardly of and above frame panel 17. Mounted on the rear face of plate 174 is an actuating solenoid 176 provided with an axial longitudinally movable armature or plunger 177. Located at the rear face of the solenoid 176 is a longitudinal arm 178 which carries a trailing bracket 179. A bell crank 180 is provided at its elbow to bracket 179 and includes an upper trailing latch arm 181 and a forwardly directed arm 182. A yoke 183 is longitudinally adjustably attached to solenoid plunger 177 and is coupled to the lower end of arm 182 by a link 184. Disposed rearwardly of bell crank 180 is a stationary block 186 and crank arm 182 is connected to the block 186 by a tension spring 187 which resiliently urges the bell crank 180 in a clockwise direction. The clockwise movement of the bell crank 180 is limited by a stop defining bolt 188 engaging a tapped bore in block 186 and adjustably locked in position therein by a cooperating lock nut, the head of bolt 188 lying in the path of the lower end of bell crank arm 182.

Crank arm 181 is provided with a rearwardly directed face 189 which, when the solenoid 176 is unenergized and the bell crank 180 is in its clockwise position, and when the pusher member 41 is retracted, engages the leading surface 77 of the latch block 76 releasably to lock the pusher member 41 in such retracted position. Furthermore, with solenoid 176 unenergized, and bell crank 180 spring urged in a clockwise direction, as the pusher member is retracted by sprocket chain 148, the latch block trailing cam face 78 bears on the upper face of the crank arm 181 to depress arm 181, which springs back to a lock position when the apex of the latch block passes rearwardly of the trailing end of arm 181.

The solenoid 176 is connected through a normally open upper switch 182a to a source of energizing current. The switch 182 is mounted atop a U-shaped bracket 183a which has rearwardly directed parallel legs slidably engaging the front border of the upper track 44 to permit the longitudinal adjustment of switch 182a. A set screw 184a, provided with a lock nut, registers with a tapped bore in the bracket lower leg and bears on the underface of the track 44 to permit the releasable locking of bracket 183a thereto. Switch 182a is provided on its rear face with a swingable actuating arm 186a hinged at its trailing end and carrying a roller 187a at its leading end. Roller 187a is disposed on the longitudinal path of the trip member 83 mounted on the slide bar 81 when the latter is in its advanced active or depressed condition. The longitudinal position of switch 182a is adjusted so that it is actuated by the trip member 83 to its closed position when the upper pusher arm 82 is advanced to a position just forward of the leading edge of the cigar transverse feed slot 34.

Referring to FIGURES 2 and 3, upper latch assembly 172 is similar in construction to the lower latch assembly 173 and includes a suitably supported mounting plate 188a which carries a solenoid 189a provided with a longitudinal axial armature 190. A bell crank 191 is pivoted at its elbow to a bracket 192 mounted on the rear face of plate 188a and includes a trailing latch arm 193 disposed forwardly of plate 188a and a forwardly directed arm 194 projecting through an opening in plate 188a. Armature 190 is link-coupled to the free end of arm 194, and a tension spring 196 is connected between arm 194 and trailing stationary block 197. A stop-defining adjustable bolt 198 engaging the block 197 limits the clockwise movement of bell crank 191. The free end of arm 193 lies in the path of the latch block 87 of upper pusher member 40.

Solenoid 189a is connected through a normally lower open switch 199 to a source of energizing energy. Switch 199 is longitudinally adjustably mounted on lower track 51 by means of a U-shaped bracket 200 and includes a hinged actuating arm 201 carrying at its free leading end a roller 202 disposed in the path of trip member 68 on lower slide bar 59. The position of switch 199 is adjusted for the switch to be actuated when the lower pusher arm 67 is in an advancing position just forward of opening 34.

A mechanism 203, as seen in FIGURES 12 and 13 of the drawings and as described in detail in copending patent application Serial No. 271,692 of Herbert W. Marano, filed April 9, 1963, for delivering rows of cigars C through the opening 34 into the passageway P is disposed along the trailing rear section of the apparatus and includes a hopper 204 which carries a plurality of superimposed longitudinal rows of cigars C. Hopper 204 comprises front and rear, longitudinally extending vertical walls 206 and 207 respectively, front wall 206 having a bottom opening 208 formed therein coextensive and coinciding with a side opening 34, and rear wall 207 having a bottom opening formed therein aligned and coextensive with the opening 208. A transversely adjustable vertical panel 209 is disposed between the walls 206 and 207 to assure the proper loading of cigars C in hopper 204.

A pair of longitudinally spaced rollers 210 are disposed along the rear edge of the plate 30 below rear wall 207 of hopper 204 and a horizontal pusher plate 211 of the width and height of slots 34 and 208 registers with the corresponding slot formed in the rear wall 207 of the hopper. Plate 211 rests on the rollers 210 and projects rearwardly therefrom and is transversely reciprocatable to a position with its front face substantially co-planar with or slightly forward of opening 34. The rear section of pusher plate 211 is affixed atop a spacer block 212 which is mounted on a forwardly extending carrier plate 213 and the carrier plate 213, in turn, is transversely slidably mounted in any suitable manner on a pair of spaced uprights.

In order to reciprocate plates 211 and 213, there ie provided a continuously running electric drive motor 216 having a pulley 217 affixed to its drive shaft and connected by a belt 218 to a pulley 219 mounted on the input shaft of a speed reducer unit 220. A sprocket wheel 221 is mounted on the output shaft of speed reducer unit 220 and is coupled by a sprocket chain to a sprocket wheel connected to input shaft of an electric clutch unit 222. The output shaft of clutch unit 222 is connected by a coupling member 223 to the horizontal shaft of a right angle drive unit 224 having a vertical output shaft 226. The electric clutch unit is of the type where coupling between the output and input shafts thereof is effected upon electrical energization of the unit 222 and the output shaft is double ended, and projects through both ends of the unit.

Affixed to output shaft 226 is a crank arm 227 which carries an upwardly directed eccentric crank pin 228 which is adjustable along the length of the arm 227 thereby to vary the throw of crank pin 228. Depending from the rear border of plate 213 and affixed thereto is a bracket 229 having a transverse bore formed therein. A cylindrical rod 230 slidably engages the bracket bore and projects beyond both ends thereof, the forward end of the rod 230 carrying a yoke member 232 and the rear end of the rod 230 being threaded and engaged by a pair of nuts 233. A helical compression spring 234 is carried by rod 230 and entrapped between the confronting faces of bracket 229 and inner nut 233 normally to urge rod 230 rearwardly relative to bracket 229 and yoke member 232 into abutment therewith. Yoke 232 is coupled to eccentric pin 228 by a turnbuckle link 236 including a front eye member 237 engaging crank pin 228 and a rear eye member 238 pin-connected to yoke 232, the eye members 237 and 238 having tapped bores engaged by the opposite threaded ends of a connecting rod 239.

Electric clutch 222 is connected through a normally closed switch 240 to a suitable source of energizing current, isolated from the current source energizing solenoids 176 and 189a, and is also connected through each of the switches 182a and 199 to said isolated current sources. Switch 240 is provided with a swingable actuating arm 241 carrying at its free end a follower-defining roller 242. Engaging follower 242 is a circular cam 243 having a single sharp raised section 244, cam 243 being affixed to the output shaft of clutch unit 222 and driven in synchronism with crank arm 227. Cam 243 is so phased or adjusted relative to pusher plate 213 that when said pusher plate 213 is in its rear retracted position, as shown in FIGURE 12 of the drawing, cam section 244 engages follower 242 to open switch 240. Thus, upon the momentary closing of either of switches 182a or 199 by the corresponding advancing pusher member 40 or 41, clutch 222 is energized to couple motor 216 and advance pusher plate 211 and rotate cam 243. With the rotation of cam 243, cam section 244 disengages follower 242 thereupon releasing arm 241 and closing switch 240. The closed switch 240 keeps clutch unit 222 energized and motor 216 coupled until pusher plate 211 completes its full reciprocation stroke and returns to its retracted position, in which position cam section 244 engages follower 242 to open switch 240 and de-energize clutch unit 222 and decouple motor 216 and hence stop pusher plate 211. It will be noted that although clutch unit 222 and a solenoid as 176, 189 are simultaneously energized, the solenoid release mechanism and the initial movement of the corresponding pusher member are slow relative to the reciprocation of pusher plate 211, so that the pusher plate 211 has at least started its return stroke before the respective pusher arm reaches the trailing cigar of the last delivered row thereof. If desired, solenoids 176 and 189 may be provided with a small adjustable delay, but this has not been found necessary.

Considering now the operation of the apparatus described above in feeding cigars C to the rotating indexing wheel 11, hopper 204 is loaded with cigars C which drop to the bottom plate 30 in successive longitudinally extending rows. One of the switches, for example upper switch 182a, is momentarily closed to effect a reciprocation stroke of the pusher plate 211 which advances the bottom row of cigars C transversely from hopper 204 through openings 208 and 34 into the passageway P in the manner described above. The solenoid 176 is simultaneously energized to pull armature 177 and swing bell crank 180 clockwise against the urging of spring 187 and thereby depress arm 181 out of engagement with latch block 76 to release the lower pusher member 41. The pusher member is advanced by descending weight member 88 through the pull of cable 89. With the advance of pusher member 41, follower 70 travels upwardly along the inclined surface 158 to raise slide bar 59 and pusher arm 67 through the opening 38 to just above the level of plate 30 and into registry with the passageway P. As the pusher member is advanced further by the descending weight, pusher arm 67 is retained in its raised position by the engagement of upper track 151 by follower 70, and bears upon the trailing cigar C in the passageway P to advance the row of cigars therealong to the indexing wheel 11 which rapidly removes and discharges successive leading cigars C. When pusher arm 67 advances beyond the feed opening 34, trip 68 momentarily engages roller 202 and closes switch 199, to effect the reciprocation stroke of pusher plate 211 and the delivery of another row of cigars into passageway P, as previously described. Simultaneously, solenoid 189 is momentarily energized to disengage latch block 87 and release the upper pusher member 40 which is advanced by the descending weight 97 through cable 98. Follower 86, with the advance of pusher member 40, rides along surface 130 to advance the slide bar 81 to its depressed position with pusher arm 82 in registry with the passageway P and arm 82 is brought into engagement with the trailing face of end cigar C of the last delivered row thereof to advance the row of cigars. It should be noted that with the advancing of slide members 59 and 81 to their advanced active position, the corresponding return springs associated therewith are loaded.

When follower 70 advances to the end of passageway 151, it is released by wall 153, slide bar 49 is retracted by tension spring 65 to lower the follower to passageway 152 and to retract follower arm 67 from the passageway P through opening 37 and below plate 30. The block 69 is lowered with slide bar 59 into the return path of the continuously moving sprocket chain pin elements 149, one of which engages the front face of block 69 rapidly to return the pusher member toward its retracted position with its pusher arm 67 in retracted inactive condition. As pusher member 41 returns, follower 70 travels between cam surface 164 and the underface of wall 153 to depress check lever 160, and when follower 70 passes the end of the wall 153, the check lever 160 is released and raises follower 70 to the bottom level of inclined surface 158. Furthermore, with the retraction of pusher member 41, latch block 76 passes over latching arm 181, depressing arm 181 which is released when registering with block leading surface 77 releasably to lock pusher member 41 in its retracted position preparatory to the next cycle.

Similarly, when the upper pusher member follower reaches the end of lower passageway 127, it is retracted to its raised position to raise slide bar 81 and pusher arm 82 and block 84 which is engaged by a sprocket chain pin 118 to return the upper pusher member to its retracted position where it is releasably locked by upper latching assembly 172. Furthermore, follower 86 passes beyond the trailing end of wall 123 and is directed toward the lower passageway by check lever 133.

While there has been described and illustrated a preferred embodiment of the present invention, it is apparent that numerous alterations, omissions and additions may be made without departing from the spirit thereof.

I claim:

1. An article feeding apparatus comprising a pair of pusher members movable along predetermined paths between advanced and retracted positions, means for releasably locking said pusher members in said retracted positions, means for returning said pusher members to said retracted positions, means for urging said pusher members toward said advanced positions, and means responsive to a predetermined position of each of said pusher members forward of said retracted position for actuating an opposite of said locking means to release the other of said pusher members.

2. An article feeding apparatus comprising a longitudinally extending track, means for depositing a longitudinally extending row or articles on said track, a pair of pusher members movable between retracted and advanced positions in paths along said track, means for urging said pusher members toward said advanced positions, means for returning said pusher members to said retracted positions, means for releasably locking said pusher members in said retracted positions, and means responsive to a predetermined position of each of said pusher members forward of said retracted position for actuating an opposite of said locking means to release the other of said pusher members.

3. An article feeding apparatus comprising a longitudinally extending track, means for depositing a longitudinally extending row of articles on said track, a pair of pusher members movable between retracted and advanced positions in paths along said track, means for urging said pusher members toward said advanced positions, means for returning said pusher members to said retracted positions, means for releasably locking said pusher member in said retracted positions, and means responsive to a predetermined position of each of said pusher members forward of said retracted position for actuating an opposite of said locking means to release the other of said pusher members, and for actuating said depositing means.

4. The apparatus of claim 3, wherein said means for urging said pusher members toward said advanced position includes vertically movable weight members and a flexible line connecting each of said weight members to a corresponding of said pusher members, said pusher members advancing with the fall of corresponding of said weight members and said weight members being raised with the return of corresponding of said pusher members.

5. The apparatus of claim 3, wherein said means for returning each of said pusher members to said retracted positions includes a continuously running endless chain having a longitudinally extending return advancing run, a plurality of longitudinally spaced detent elements carried by said chain, and means carried by said pusher member for engagement by said detent elements along said return run upon said pusher member reaching said advanced position.

6. The apparatus of claim 3, wherein each of said pusher members includes a pusher element transversely movable between advanced and retracted positions in and out of longitudinal registry respectively with the path of said articles along said track and comprising means for urging said pusher element to its advanced position during the forward movement of said pusher member and to a retracted position during the return of said pusher member.

7. The apparatus of claim 3, wherein said pusher member locking means includes a latch element releasably engaging said pusher member when in retracted position and movable to a release position, a solenoid, an armature actuatable by said solenoid and connected to said latch member, and said pusher member position responsive means includes a normally open switch disposed along the paths of and actuatable by said pusher member and connected in series with said solenoid to a source of energizing current.

8. The apparatus of claim 7, wherein the position of said switch is longitudinally adjustable.

9. An article feeding apparatus comprising means defining a passageway extending longitudinally from a trailing to a leading end, a pair of upper and lower rails parallel to and disposed at levels above and below said passageway, upper and lower carriers slidable along respective of said rails, a pusher element supported by each of said carriers and vertically movable between an active position in registry with said passageway and an inactive position out of registry therewith, means for urging said carriers to advance along said rails toward said passageway leading end, means for returning said carriers to a retracted position adjacent to said passageway trailing end, latching means for releasably locking each of said carriers in said retracted position, means for moving said pusher elements to an active position during the advance of said respective carrier and to an inactive position during the return thereof, means responsive to the advance of one of said carriers past a predetermined point for actuating said latching means to release the other of said carriers, and means for depositing rows of articles in said passageway.

10. The apparatus of claim 9 wherein said article depositing means includes an article holding hopper disposed along at least one side of said passageway and having an opening providing transverse communication between said hopper and said passageway, and a pusher member transversely movable along the bottom of said hopper in alignment with said opening.

11. The apparatus of claim 10 including means for reciprocating said transverse pusher member responsive to the movement of said carriers past predetermined points forward of the leading edge of said transverse communication opening.

12. The apparatus of claim 9 wherein each of said pusher elements includes a vertical slide bar mounted on said carrier and spring urged to a pusher element inactive position.

13. The apparatus of claim 12 wherein said means for moving said pusher elements to said active and inactive positions comprises longitudinally extending cam defining tracks including upper and lower parallel runs, and a follower mounted on said slide bars and engaging respective of said cam tracks.

14. The apparatus of claim 12 wherein said carrier return means comprises continuously driven endless chains having longitudinally return runs, longitudinally spaced detents carried by said chains, and an abutment member mounted on each of said slide bars and disposed in the path of said detents along said return run when said respective slide bar is in a pusher element inactive position and out of registry with said path when said slide bar is in pusher element active position.

15. The apparatus of claim 12 wherein said latching means includes a release solenoid and said latch actuating means includes a normally open switch having a movable control members disposed at said predetermined point, said solenoid being connected through said switch to a source of energizing current, and a detent mounted on each of said slide bars and movable therewith into engagement with respective of said switch control elements when said slide bars are in their pusher element active positions.

16. The apparatus of claim 9 wherein said carrier advancing means includes a pair of vertically movable weights, a pair of pulleys rotatable about vertical axes and a longitudinally extending flexible line passing over each of said pulleys and connecting each of said weights to a corresponding of said carriers.

References Cited by the Examiner
UNITED STATES PATENTS 1,985,765   12/34   Cornock _____ 198—24 X SAMUEL F. COLEMAN, *Primary Examiner.*